US005221398A

United States Patent [19]

Williams

[11] Patent Number: 5,221,398

[45] Date of Patent: Jun. 22, 1993

[54] CONTAMINATED-SURFACE APPLICATOR SYSTEM

[75] Inventor: James R. Williams, Keene, N.H.

[73] Assignee: Imtec, Inc., Bellows Falls, Vt.

[21] Appl. No.: 518,819

[22] Filed: May 4, 1990

[51] Int. Cl.[5] .......... B32B 31/12

[52] U.S. Cl. .......... 156/281; 156/310; 427/207.1

[58] Field of Search .......... 156/281, 535, 310; 427/207.1

[56] References Cited

U.S. PATENT DOCUMENTS

| | | | |
|---|---|---|---|
| 1,734,148 | 11/1929 | Rightmire | 427/207.1 |
| 1,962,660 | 6/1934 | Keller | 156/310 X |
| 2,716,612 | 8/1955 | Marks et al. | 156/310 X |
| 3,773,580 | 11/1973 | Provost | 156/310 X |
| 3,802,986 | 4/1974 | Forsythe | 156/310 X |
| 4,311,746 | 1/1982 | Chavannes | 428/110 |
| 4,398,984 | 8/1983 | Uchiyama et al. | 156/281 X |

*Primary Examiner*—David A. Simmons
*Assistant Examiner*—Mark A. Osele
*Attorney, Agent, or Firm*—Stephen G. Matzuk

[57] ABSTRACT

A method of (and apparatus for) applying and adhering an adhesive-backed label to the surface of a material (e.g., the butt end of a board) in the presence of a contaminant (e.g., sap) that neutralizes the adhesive forces of the adhesive. The method includes the serial steps of applying a surface preparation layer or substance (e.g., a hot-melt adhesive) to the material, the layer (or substance) being compatible with the material to be labeled and the adhesive of the label and being further capable of displacing the contaminant in such a way as to restore the adhesive force between the label adhesive and the material to be labeled; and, immediately thereafter, applying the adhesive surface of an adhesive backed label to the surface thus prepared, that is, onto the surface preparation layer.

11 Claims, 2 Drawing Sheets

CONTAMINATED-SURFACE APPLICATOR SYSTEM

BACKGROUND OF THE INVENTION

The present invention relates to an effective way to cause two objects to adhere together in spite of the presence of a third material which tends to neutralize adhesive forces therebetween and, more particularly, to apparatus (and method) to apply gummed labels (e.g., bar-graph labels) to surfaces that have immersed solvents and like contaminants thereon.

The art of labeling and machines to achieve labeling (e.g., bar code or other labels) are discussed in some detail in applications for U.S. Pat. No. 328,286, filed Mar. 24, 1989 (Murphy) (now U.S. Pat. No. 5,013,156) and U.S. Pat. No. 386,214 filed Jul. 28, 1989 (Murphy) (now U.S. Pat. No. 5,000,812). It is noted in the applications that label applicators of IMTEC, INC. of Bellows Falls, Vt., and others are in widespread use, that is, well known in this art. Hence, it is not necessary for present purposes, to explain in exhaustive detail how label applicators work to perform their functions. Thus, later herein, a label applicator is shown as a block marked "LABEL APPLICATOR"; nothing more is needed for, although the applicator so marked is part of the total inventive concept here, details of such applicator are not needed because workers in the art are familiar with such details; the essence of this invention lies elsewhere.

SETTING OF THE INVENTION

There are many labeling applications in which it is desirable to have an object adhere to another through some kind of an adhesive in spite of the presence of an intervening contaminant which may, at least temporarily, neutralize the adhesive properties of the adhesive with respect to the object.

This invention, as will become apparent, is particularly focused on applying bar-graph adhesive labels and the like to surfaces, newly-cut wood surfaces, typically, that exude a liquid solvent (e.g., water, sap) that, unless counter-action is taken, will dissolve, or otherwise render ineffective, the adhesive on the label to perform an adhering function. What one would ideally like is a situation in which rough-cut boards (e.g., two-by-fours or two-by-sixes) or the like have applied to a surface (typically the butt-cut surface) thereof a label which will serve to identify the board for further purposes. The emphasis here is on what is well known to be green wood. Many thousands of units of such green wood are processed each day in a wood mill. The identification of each unit as indicated is ultimately necessary.

Thus, an excellent example of a place in which this invention is useful is the lumber industry where competitive pressures are mandating the use of automation in all phases of processing lumber. In order to identify and maintain inventory, some form of machine readable identification must be associated with the lumber products. The more detailed the identification and the sooner in the process that the identification is made, then the more the identification itself can be used as part of controlling the processes themselves. The dimensions of the various products obtained by sawing a log are determined as the log is sawed. Since lumber products are principally classified by species, quality and dimension, if a way existed to label each product (board) as it came from the saw with a machine readable label, then the information contained thereon could be used in all subsequent processes such as automatic sorting, planing, millwork, bundling, etc., as well as the more conventional inventory management.

In general, logs are sawed while they are still green, both because it is very difficult and time consuming to dry a whole log and because the stresses that build up the log during the drying process make sawing itself extremely difficult. The labeling problem that arises with recently sawed boards is that they are full of sap (mostly water). Any label applied to a board must adhere to the board in order to be of any use later. In attempting to apply a label to the board, this water presents a third material (also termed contaminant herein) to the adhesive on the label. In essence, the label gets applied to a film of water, not to the board itself. Many adhesives are simply incompatible with water and lose their adhesive properties completely in its presence. Water base adhesives themselves provide no direct solution to the problem since the label has till been applied to what amounts to a film of water and it is easily removed or dislodged completely. The differential stresses on the label as drying takes place result in curl of the label. These forces are usually significant enough to peel the label back away from the board surface.

Boards are usually cut with the smallest surface being the end grain or butt. When they are stacked, it is the end grain of each board that shows in the stack, not necessarily either of the face grains. Further, subsequent milling and planing operations are usually done on the face grains. For these and other reasons it is desirable to label the end grain. Unfortunately, the adhesion problem is further compounded if the label is applied to the end grain surface of the board. The end grain surface is generally quite rough both because of the sawing operation and the porosity and texture of the wood itself. This roughness results in a very low effective surface area of the wood. The combination of low surface area and wet surface conditions make label adhesion a difficult problem indeed.

OBJECTIVES OF THE INVENTION

Accordingly, it is an objective of the present invention to provide a labeling system that is capable of applying labels to surfaces that are contaminated with the presence of an adhesive-neutralizing material such as water.

Still another objective of the invention is to provide a system as above that will effectively label rough surfaces.

A further objective is to provide a system as above that will generate various labels on demand and apply them to objects moving past the labeling system at high speed.

A still further objective is to provide apparatus (and method) which is adapted to present and adhere an adhesive label to the butt end of the surface of green wood, that is, wood that has just recently been cut and is "wet" as that term is used in the art.

These and further objectives will become apparent hereinafter.

SUMMARY OF THE INVENTION

The above objectives are achieved in apparatus (or method) that includes a first stage surface preparation device for automatically applying an intervening substance, filler or caulk that is compatible both with a surface to be labeled, a contaminant thereon and the label adhesive, the apparatus including a transport mechanism including optional label printer and label laminator that is capable of transporting individual labels to an applicator and an applicator that is capable of applying labels to such previously prepared surfaces.

Said another way, the foregoing objectives are achieved, in one aspect, in a method of (and apparatus for) applying an adhesive label to the surface of a material (e.g., green wood) that has an immersed solvent (e.g., water or sap) within the material. The method includes a first step of applying a hot-melt high-viscosity adhesive or the like to the surface of the material, which hot-melt, high-viscosity adhesive becomes tacky upon application or shortly thereafter; and, then, applying the adhesive surface of an adhesive layer to the surface of the material, tacky at this point, which adhesive label adheres to the surface of the material.

BRIEF DESCRIPTION OF THE DRAWING

The invention is hereinafter described with reference to the accompanying drawing in which.

DETAILED DESCRIPTION OF THE INVENTION

Figure 1A:
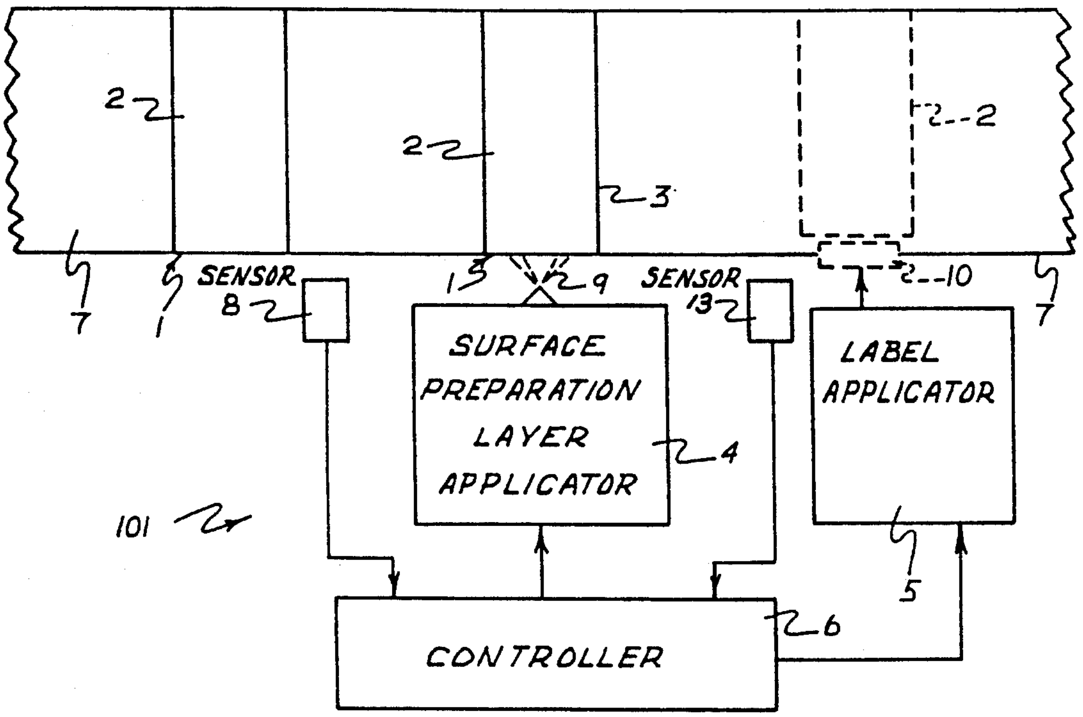
FIG. 1A shows in block diagram form apparatus for applying a surface preparation layer (or substance) and an adhesive-backed label to an object that has a surface contaminated with a third material or contaminant.
Figure 1B:
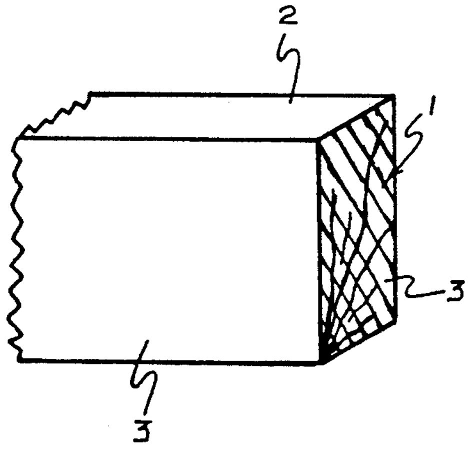
FIG. 1B is an isometric, partial view of an object which may be acted upon by the apparatus in FIG. 1A and which here is a board.
Figure 1C:
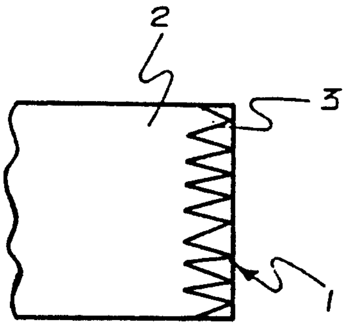
FIG. 1C is a plan view of the right end of the board in FIG. 1B.

Turning now to the figures, there is shown at 101 in FIG. 1A a system for applying a surface preparation layer to the surface 1 of a material 2 in the presence of a contaminant 3 that may present both on the surface 1 as well as absorbed throughout the material 2. The absorbed contaminant 3 is assumed to be able to migrate freely through the material 2 by capillary action to the surface 1 as well as other surfaces, and hence the absorbed portion is considered to be a continuous source of supply of surface contaminant as opposed to contaminant with which one need not reckon.

The system (or apparatus) 101 includes a mechanism 4 for applying a surface preparation layer 9 (i.e., a substance that is compatible with the material 2 to be labeled and the adhesive on the label: e.g., a polyamide such as sold under the trademark Bostik 4252; a polyester such as sold under the trademark Bostik 4165; or a polyurethane such as sold under the trademark Bostik Supergrip 2000) to the surface 1 of the material 2 to be labeled. The system 101 typically includes a transport mechanism 7, generally but not necessarily in the form of a high speed conveyor, for moving individual pieces of the material 2. The transport mechanism 7 is assumed to operate continuously, thereby causing individual pieces of the material 2 to pass in sequence past the mechanism 4. Following the mechanism 4 is a label applicator mechanism 5 which applies an adhesive backed label 10 to the previously prepared surface 1. The applicator 5 typically but not necessarily includes a printer for printing the label prior to application of the on demand information specific to the individual piece of material 2 being labeled; such applicators as that shown at 5 are well known and have been manufactured for several years by IMTEC, INC., Bellows Falls, Vt.

The surface preparation material mechanism 4 and the label applicator mechanism 5 are responsive to signals from a controller or controllers 6 shown for illustration as a single device in the figure. Sensors 8 and 13 determine the presence of material pieces 2 to which the preparation layer or substance 9 or the labels 10 are to be applied and alert the controller 6 accordingly.

FIGS. 2A–2D show the various states of the material 2 as it is subjected to the processes of the system 101; the material is marked 2' in these figures.

Figure 2A:
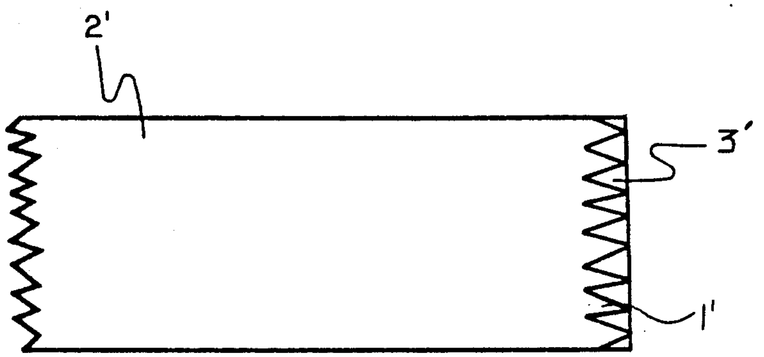
FIGS. 2A, 2B, 2C and 2D are plan views of a typical material (or object) as it is presented for labeling, FIG. 2A showing the material as it is presented for labeling, FIG. 2B showing the result of labeling without primary surface preparation, FIG. 2C showing the material immediately after preliminary surface preparation, and FIG. 2D showing the result of the complete labeling process.

FIG. 2A is a top view of a typical material 2' consisting of a board recently sawed from a log. The surface 1' is the end grain of the board. The end grain surface 1' as well as the face grain surfaces of the board 2' are covered with a surface contaminant 3'. The contaminant 3' is a sap which is predominantly water. The sap not only covers the surface but is usually totally absorbed throughout the volume of the board 2'. The end surface 1' is not only rough from sawing but is also quite porous by nature, being the end fibers of a tree.

Figure 2B:
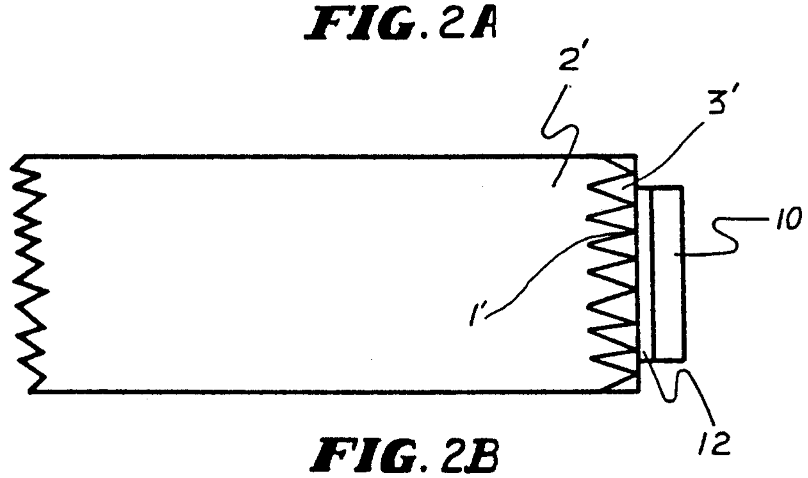

FIG. 2B is a top view of the same material 2' after an attempt has been made to apply an adhesive 12 of adhesive-backed label 10 to the surface 1' in the presence of the surface contaminant 3' (sap). From the figure it can be seen that the majority of the surface area of the adhesive layer 12 is contacting the contaminant 3' while only a minor percentage of the surface area of the adhesive layer 12 is in a bonding contact with the fibers of the wood 2'. Under these conditions the label 10 is essentially unadhered to the board 2'.

Figure 2C:
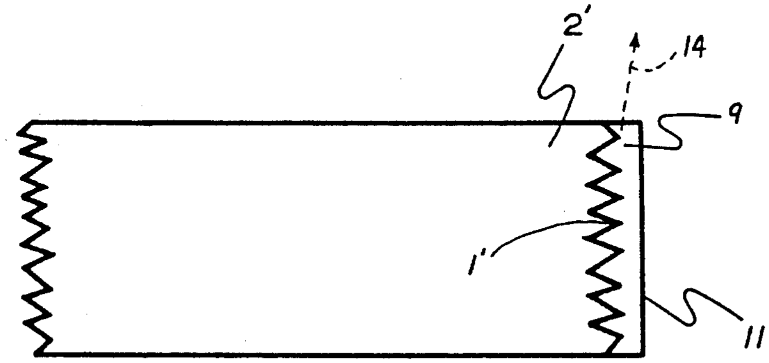
Figure 2D:
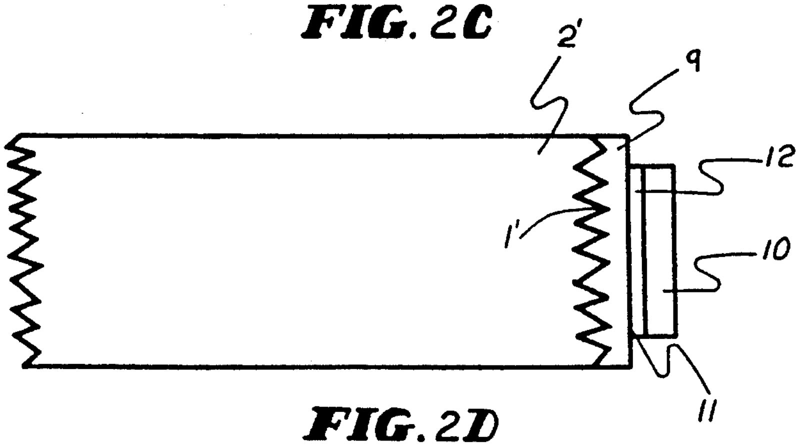

FIG. 2C is a top view of the same material 2' immediately after it has been treated with the surface preparation substance 9. The surface preparation substance 9 consists of a hot melt type adhesive that has an adhesive affinity for the surface to be prepared (in this case wood) as well as the adhesive 12 on the label 10. Further, this material is in the form of a viscous solid at room and wood finishing temperatures, but can be stably liquified to a viscosity suitable for spraying, brushing or rolling at elevated temperatures. Further, specific heat of the material 9 is sufficient to ensure that at the liquified temperature the latent heat (i.e., stored heat) of the substance 9 is sufficient to evaporate the surface contaminant 3' from the surface 1'. In operation, as the material 9 is applied to the end grain surface 1' of the board 2', the latent heat of the substance 9 evaporates the contaminant 3' from the surface 1' converting it to water vapor 14 in FIG. 2C which passes into the atmosphere or is driven back into volume of the board 2'. The energy absorbed from the material 9 by evaporating this water 3' causes rapid cooling of the substance 9, thereby increasing its viscosity considerably. Since the hot melt substance 9 has an adhesive affinity for the material of the board 2', the immediate surface 1' of which is rendered effectively dry by the evaporation of the surface moisture, the hot melt substance 9 bonds securely to the surface 1'. The quantity of material applied is made sufficient to fill the end grain of the surface 1'. The surface tension, cohesive and viscosity properties of the substance 9 are such that it cures to a smooth surface 11 (FIGS. 2C and 2D). By suitably adjusting the material and operating parameters of the mechanism 4 and the substance 9, the result is a surface layer 11 applied and bonded to the surface 1' of the board 2', which layer 11 has cured to a smooth tacky consistency that is adhesively compatible with the adhesive backing 12 of the label 10. This bonding and curing take place in a very short period of time, generally under five seconds, so that it is suitable for use in a high speed conveyorized system.

FIG. 2D shows the finished result of passing the board 2' through the system 101. The cured layer 9 is bonded to the surface 1' of the board 2'. The label 10 has been applied to the surface 11 of the cured layer 9 and is held firmly in place by the adhesive forces developed between the adhesive 12, the layer 9 and the label 10.

Modifications of the invention herein disclosed will occur to persons skilled in the art and all such modifications are deemed to be within the scope of the invention as defined by the appended claims.

What is claimed is:

1. A method of applying and adhering an adhesive-backed label to the end-grain surface of a green board in the presence of a contaminant that neutralizes the adhesive forces of the adhesive, said method comprising:

applying a heated hot-melt adhesive surface preparation layer to the green board said layer being compatible with the green board to be labeled and the adhesive of the label and being further capable of evaporating the contaminant in such a way as to restore the adhesive forces between the label adhesive and said green board; and then applying the adhesive surface of an adhesive-backed label to the surface thus prepared.

2. A method according to claim 1 in which said contaminant is a liquid and in which said displacing effects an increase in viscosity of the liquid contaminant to a tacky consistency adhesively consistent with the adhesive of said label in a very short time period under five seconds.

3. A method according to claim 1 in which the evaporation of the contaminant produces rapid curing of the hot melt adhesive, rendering it sufficiently viscous to prevent flow.

4. A method according to claim 3 in which the curing is sufficiently rapid to permit high-speed application of an adhesive-backed label.

5. A method according to claim 1 in which the layer is liquid taken from the group consisting of a polyamide, a polyester and urethane.

6. A method according to claim 1 in which the surface preparation layer thus applied reacts chemically with the contaminant to remove it from the surface.

7. A method according to claim 1 in which the surface preparation layer is such that the contaminant is miscible in it.

8. A method according to claim 1 in which the surface preparation layer so applied is a viscous solid at room temperature but can be stably liquified to a viscosity suitable to one of spraying, brushing and rolling at elevated temperatures.

9. A method of applying and adhering an adhesive-backed label to the end-grain surface of a green board in the presence of a contaminant that neutralizes the adhesive forces of the adhesive, said method comprising:

applying a heated hot-melt adhesive surface preparation layer to the end-grain surface of the green board, said layer being compatible with the green board to be labeled at the end-grained surface thereof and the adhesive of the label and being further capable of evaporating the contaminant in such a way as to restore the adhesive forces between the label adhesive and the end-grain surface of the green board; and then applying the adhesive surface of the adhesive-backed label to the surface thus prepared.

10. A method according to claim 9 in which the surface tension, cohesive and viscosity properties of the surface preparation layer are such that it cures to a smooth tacky consistency that is adhesively compatible with the adhesive backing of said label, said bonding and curing taking place in a very short period of time sufficiently short for the method to be of use in a high-speed conveyorized system.

11. A method according to claim 10 in which said very short period of time is generally under five seconds.

* * * * *